United States Patent
Waldman et al.

(10) Patent No.: US 9,879,544 B2
(45) Date of Patent: Jan. 30, 2018

(54) TURBINE ROTOR BLADES WITH IMPROVED TIP PORTION COOLING HOLES

(71) Applicant: HONEYWELL INTERNATIONAL INC., Morristown, NJ (US)

(72) Inventors: David Waldman, Chandler, AZ (US); Mark C. Morris, Phoenix, AZ (US); Malak Fouad Malak, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1133 days.

(21) Appl. No.: 14/055,521

(22) Filed: Oct. 16, 2013

(65) Prior Publication Data

US 2015/0104326 A1    Apr. 16, 2015

(51) Int. Cl.
*F01D 5/18* (2006.01)
*F01D 5/14* (2006.01)
*F01D 5/20* (2006.01)

(52) U.S. Cl.
CPC .............. *F01D 5/18* (2013.01); *F01D 5/147* (2013.01); *F01D 5/20* (2013.01); *F05D 2230/00* (2013.01); *F05D 2260/20* (2013.01); *Y02T 50/673* (2013.01); *Y10T 29/49341* (2015.01)

(58) Field of Classification Search
CPC ... F01D 5/18; F01D 5/20; F01D 5/147; Y02T 50/673; Y10T 29/49341; F05D 2260/20; F05D 2230/00; B23P 15/04; B23B 35/00; B23B 2215/81; B23C 3/28; B23C 3/24; B23C 2215/44
USPC .................................. 408/1 R; 409/131, 132
See application file for complete search history.

(56) References Cited

U.S. PATENT DOCUMENTS

| | | | |
|---|---|---|---|
| 4,142,824 | A | 3/1979 | Andersen |
| 4,390,320 | A | 6/1983 | Eiswerth |
| 4,529,357 | A | 7/1985 | Holland |
| 4,589,823 | A | 5/1986 | Koffel |
| 5,039,562 | A | 8/1991 | Liang |

(Continued)

FOREIGN PATENT DOCUMENTS

| | | |
|---|---|---|
| EP | 1281837 A1 | 2/2003 |
| EP | 1422383 A2 | 5/2004 |

(Continued)

OTHER PUBLICATIONS

EP Extended Search Report for Application No. 14179939.5 dated Feb. 16, 2015.

(Continued)

*Primary Examiner* — Dwayne J White
*Assistant Examiner* — Adam W Brown
(74) *Attorney, Agent, or Firm* — Lorenz & Kopf, LLP

(57) ABSTRACT

A turbine rotor blade is provided for a turbine section of an engine. The turbine rotor blade includes a platform and an airfoil extending from the platform into a mainstream gas path of the turbine section. The airfoil includes a first side wall; a second side wall joined to the first side wall at a leading edge and a trailing edge; a tip cap extending between the first side wall and the second side wall; a first parapet wall extending from the first side wall; and a first cooling hole through the tip cap and the first parapet wall configured to deliver cooling air. The first cooling hole has a closed channel section and an open channel section. The open channel section forms a slot.

15 Claims, 11 Drawing Sheets

(56) References Cited

U.S. PATENT DOCUMENTS

| | | | |
|---|---|---|---|
| 5,192,192 A * | 3/1993 | Ourhaan | F01D 5/18 |
| | | | 415/115 |
| 5,282,721 A | 2/1994 | Kildea | |
| 5,688,107 A | 11/1997 | Downs et al. | |
| 5,733,102 A | 3/1998 | Lee et al. | |
| 6,164,914 A | 12/2000 | Correia et al. | |
| 6,179,556 B1 | 1/2001 | Bunker | |
| 6,190,129 B1 | 2/2001 | Mayer et al. | |
| 6,231,307 B1 | 5/2001 | Correia | |
| 6,422,821 B1 | 7/2002 | Lee et al. | |
| 6,478,535 B1 | 11/2002 | Chung et al. | |
| 6,494,678 B1 | 12/2002 | Bunker | |
| 6,527,514 B2 * | 3/2003 | Roeloffs | F01D 5/186 |
| | | | 416/97 R |
| 6,602,052 B2 | 8/2003 | Liang | |
| 6,634,860 B2 | 10/2003 | Lee et al. | |
| 6,672,829 B1 | 1/2004 | Cherry et al. | |
| 6,790,005 B2 | 9/2004 | Lee et al. | |
| 6,932,571 B2 | 8/2005 | Cunha | |
| 6,981,846 B2 | 1/2006 | Liang | |
| 6,994,514 B2 * | 2/2006 | Soechting | F01D 5/187 |
| | | | 415/115 |
| 7,192,250 B2 | 3/2007 | Boury et al. | |
| 7,351,035 B2 | 4/2008 | Deschamps et al. | |
| 7,473,073 B1 | 1/2009 | Liang | |
| 7,494,319 B1 | 2/2009 | Liang | |
| 7,510,376 B2 | 3/2009 | Lee et al. | |
| 7,530,788 B2 * | 5/2009 | Boury | F01D 5/20 |
| | | | 416/92 |
| 7,591,070 B2 | 9/2009 | Lee | |
| 7,695,248 B2 | 4/2010 | Mons et al. | |
| 7,857,587 B2 | 12/2010 | Correia et al. | |
| 7,922,451 B1 | 4/2011 | Liang | |
| 7,972,115 B2 | 7/2011 | Potier | |
| 7,980,818 B2 | 7/2011 | Kizuka et al. | |
| 8,061,987 B1 | 11/2011 | Liang | |
| 8,061,989 B1 | 11/2011 | Liang | |
| 8,075,268 B1 | 12/2011 | Liang | |
| 8,092,178 B2 | 1/2012 | Marini et al. | |
| 8,113,779 B1 * | 2/2012 | Liang | F01D 5/186 |
| | | | 416/92 |
| 8,182,221 B1 | 5/2012 | Liang | |
| 8,246,307 B2 | 8/2012 | Cheong et al. | |
| 8,366,394 B1 | 2/2013 | Liang | |
| 8,414,265 B2 | 4/2013 | Willett, Jr. | |
| 8,435,004 B1 | 5/2013 | Liang | |
| 8,491,263 B1 | 7/2013 | Liang | |
| 8,777,572 B2 | 7/2014 | Cheong et al. | |
| 2002/0197159 A1 | 12/2002 | Roeloffs | |
| 2003/0021684 A1 * | 1/2003 | Downs | F01D 5/145 |
| | | | 416/92 |
| 2005/0232771 A1 | 10/2005 | Harvey et al. | |
| 2006/0120869 A1 | 6/2006 | Wilson et al. | |
| 2007/0134096 A1 | 6/2007 | Mons et al. | |
| 2007/0237637 A1 | 10/2007 | Lee et al. | |
| 2008/0118363 A1 | 5/2008 | Lee et al. | |
| 2009/0148305 A1 | 6/2009 | Riahi et al. | |
| 2010/0135813 A1 | 6/2010 | Marini et al. | |
| 2010/0135822 A1 | 6/2010 | Marini et al. | |
| 2010/0221122 A1 | 9/2010 | Klasing et al. | |
| 2011/0176929 A1 | 7/2011 | Ammann | |
| 2012/0070307 A1 * | 3/2012 | Poon | F01D 5/20 |
| | | | 416/97 R |
| 2012/0201695 A1 | 8/2012 | Little | |

FOREIGN PATENT DOCUMENTS

| | | |
|---|---|---|
| EP | 1726783 A1 | 11/2006 |
| EP | 1736636 A1 | 12/2006 |
| EP | 2434097 A1 | 3/2012 |

OTHER PUBLICATIONS

EP Extended Search Report for Application No. 14182739.4 dated Apr. 7, 2015.
EP Search Report, EP 11174595.6-2321 dated May 10, 2011.
Kwak, JS, et al.; Heat Transfer Coefficients and Film Cooling Effectiveness on the Squealer Tip of a Gas Turbine Blade; Turbine Heat Transfer Laboratory, Department of Mechanical Engineering, Texas A&M University, vol. 125, Oct. 2003, Transactions of the ASME, [Retrieved from Internet Jul. 10, 2013] [http://turbomachinery.asmedigitalcollection.asme.org].
Ahn, J, et al.; Film-Cooling Effectiveness on a Gas Turbine Blade Tip Using Pressure-Sensitive Paint; Turbine Heat Transfer Laboratory, Department of Mechanical Engineering, Texas A&M University, Journal of Heat Transfer, vol. 127, May 2005, [Retrieved from Internet Jul. 10, 2013] [http://heattransfer.asmedigitalcollection.asme.org].
USPTO Office Action for U.S. Appl. No. 14/030,647 dated Nov. 17, 2016.
USPTO Office Action for U.S. Appl. No. 14/030,647 dated May 4, 2017.
USPTO Office Action for U.S. Appl. No. 14/055,568 dated Mar. 9, 2017.
USPTO Notice of Allowance for U.S. Appl. No. 14/055,568 dated Jul. 12, 2017.
USPTO Notice of Allowance for U.S. Appl. No. 14/030,647 dated Sep. 1, 2017.

* cited by examiner

TURBINE ROTOR BLADES WITH IMPROVED TIP PORTION COOLING HOLES

STATEMENT REGARDING FEDERALLY SPONSORED RESEARCH OR DEVELOPMENT

This invention was made with Government support under DTFAWA-10-C-00040 awarded by Federal Aviation Administration. The Government has certain rights in this invention.

TECHNICAL FIELD

The inventive subject matter generally relates to turbine rotor blades, and more particularly relates to turbine rotor blades with tip portion cooling holes.

BACKGROUND

Gas turbine engines are generally used in a wide range of applications, such as aircraft engines and auxiliary power units. In a gas turbine engine, air is compressed in a compressor, mixed with fuel, and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. Operating temperatures may be, for example, 1100° C. As such, it is desirable to cool the rotor blades and stator vanes to prevent or reduce adverse impact and extend useful life. Mechanisms for cooling turbine rotor blades include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge, particularly in areas such as the turbine blade tips.

Accordingly, it is desirable to have a turbine rotor blade with an improved manner for cooling the blade tip portion while maintaining or improving engine efficiency. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In accordance with an exemplary embodiment, a turbine rotor blade is provided for a turbine section of an engine. The turbine rotor blade includes a platform and an airfoil extending from the platform into a mainstream gas path of the turbine section. The airfoil includes a first side wall; a second side wall joined to the first side wall at a leading edge and a trailing edge; a tip cap extending between the first side wall and the second side wall; a first parapet wall extending from the first side wall; and a first cooling hole through the tip cap and the first parapet wall configured to deliver cooling air. The first cooling hole has a closed channel section and an open channel section. The open channel section forms a slot.

In accordance with an exemplary embodiment, a method is provided for manufacturing a turbine rotor blade. The method includes forming the turbine rotor blade including a tip portion with a first parapet wall, a second parapet wall, a tip cap extending between the first and second parapet walls, and a cooling channel at least partially defined by the tip cap; forming a step between the first parapet wall and the tip cap; forming an initial hole with a longitudinal axis by inserting a tool from a tip edge on the first parapet wall to the cooling channel; removing the tool along the longitudinal axis of the initial hole to a height approximately equal to the step; and removing the tool from the first parapet wall in a generally axial direction to form a cooling hole.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Exemplary embodiments discussed herein are directed to turbine rotor blades capable of withstanding temperature environments that are higher than those for which conventional turbine rotor blades are designed. Generally, the improved turbine rotor blade includes a first parapet wall extending from the first side wall including a first tip edge, a second parapet wall extending from the second side wall opposite the first side wall and including a second tip edge, and a tip wall extending between the first side wall and the second side wall. To provide improved cooling, the turbine blade further includes a step formed between the first tip edge and the tip cap, the step extending along a majority of a length of the first tip edge of the first side wall, and a cooling hole having a centerline extending from the first parapet wall and through the tip cap. The cooling hole may have an open channel section forming a slot from the first tip edge of the parapet wall to the step and a closed channel section extending through the tip wall. The slot may prevent or mitigate cooling hole blockages as the tip portion rubs against the shroud, particularly considering variations in manufacturing tolerances when forming the cooling holes.

Figure 1:
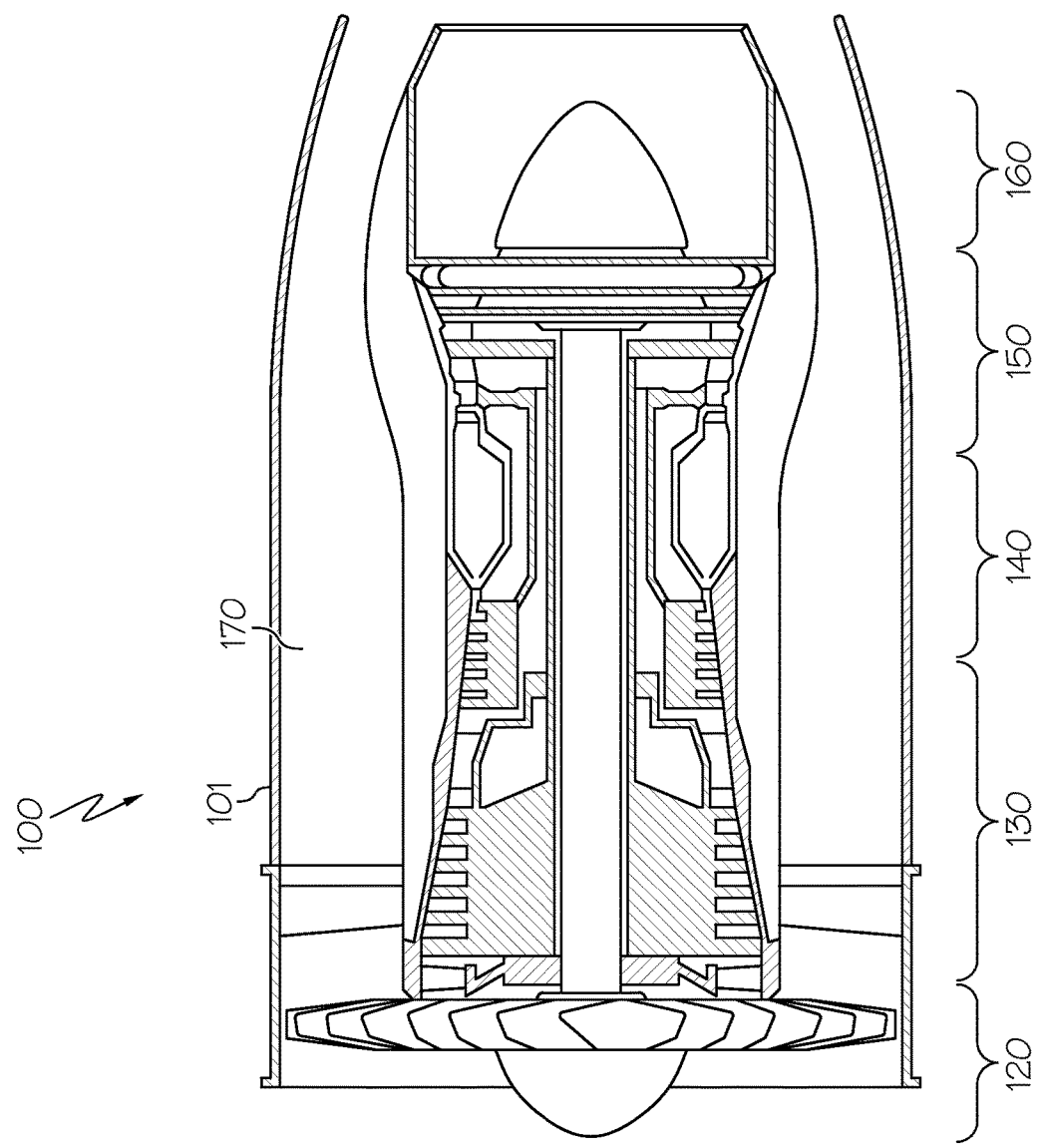
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
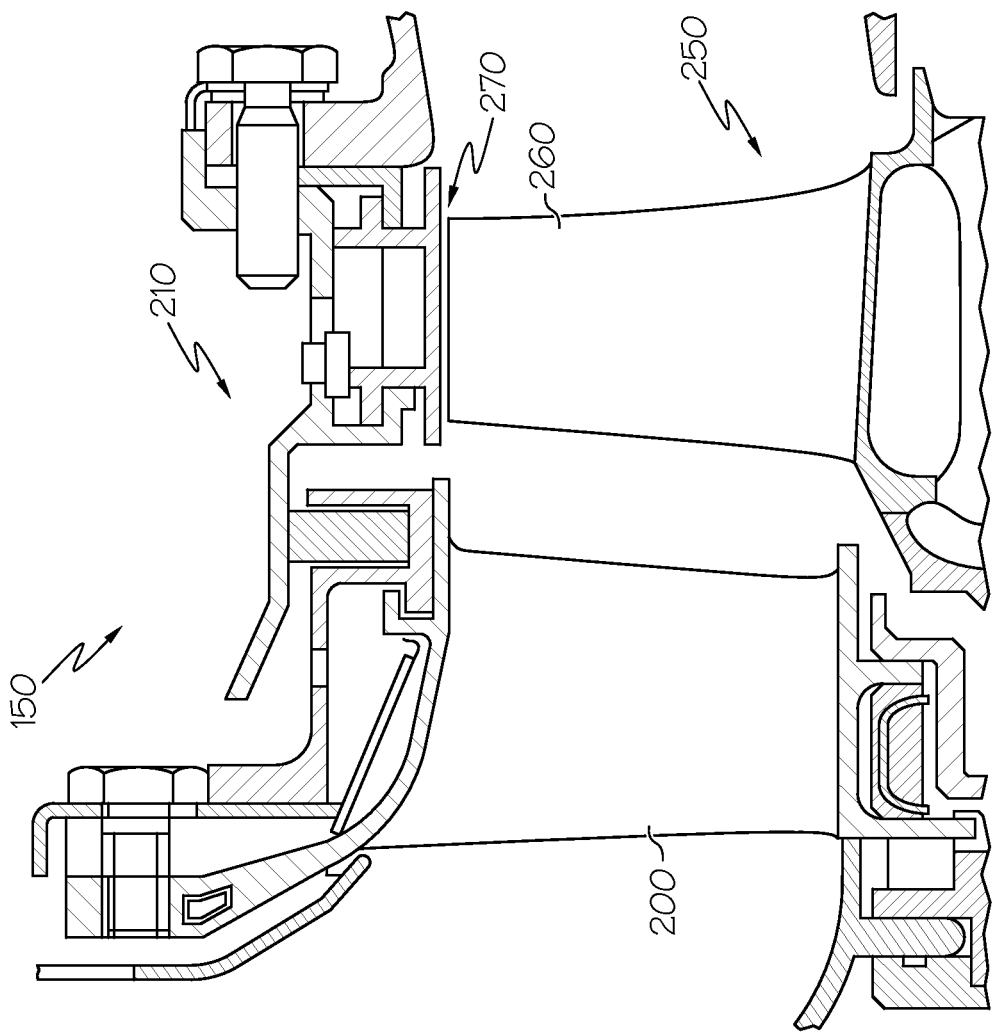
FIG. 2 is a partial, sectional elevation view of a portion of a turbine section of the gas turbine engine of FIG. 1 in accordance with an exemplary embodiment.

FIG. 2 is a partial, cross-sectional side view of a turbine section of an engine, such as the turbine section 150 of the gas turbine engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream compressor section (e.g. compressor section 130 of FIG. 1) is directed. The cylindrical shroud 210 is disposed concentric to the rotor 250 to optimize aerodynamic efficiency and forms a radial gap (i.e., blade running clearance) 270 with an outermost diameter of the rotor 250. The radial gap 270 is typically very small, for example, in a range of about 0.25 millimeter (mm) to about 0.50 mm. In other embodiments, the radial gap 270 may be larger or smaller than these ranges. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled. For example, the rotor blades 260 may be cooled as described in greater detail below.

Figure 3:
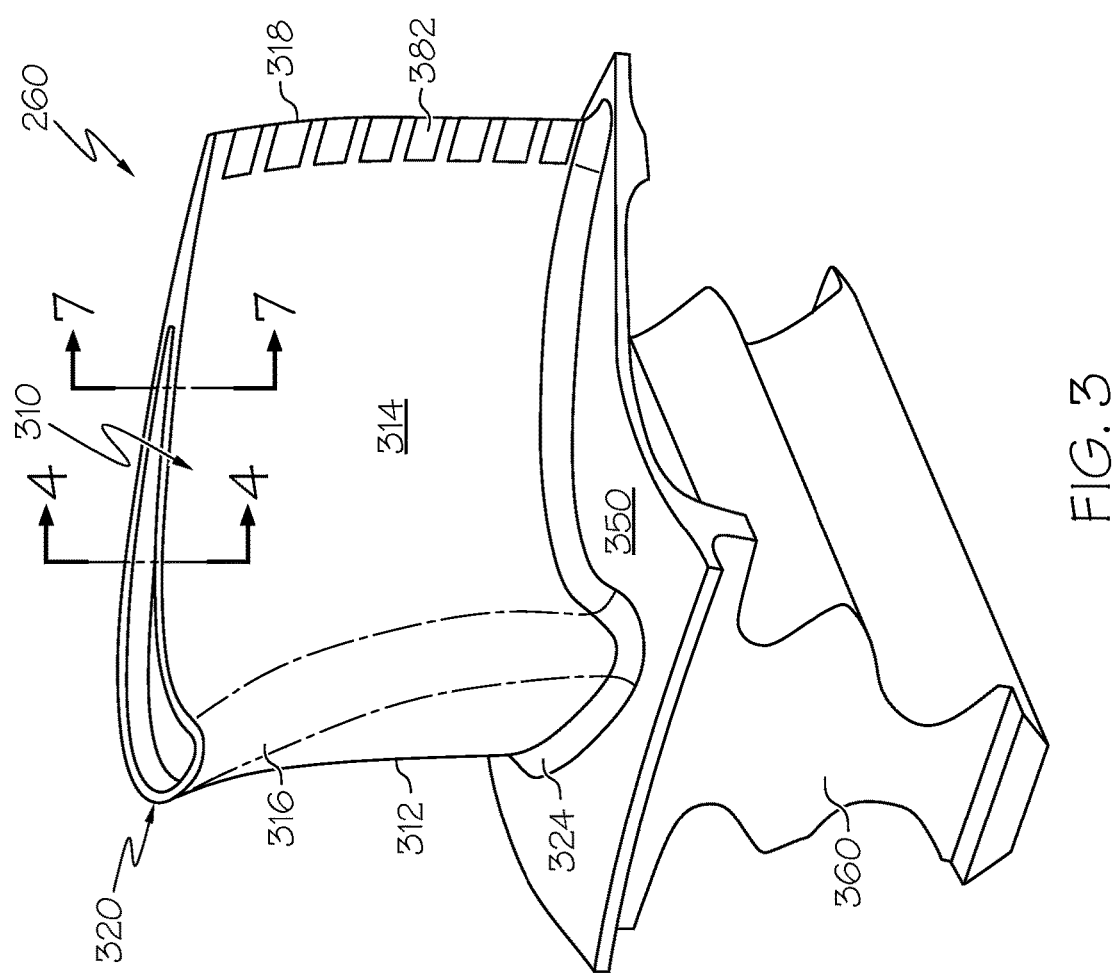
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform 350 and is configured to couple the blade 260 to a turbine rotor disc (not shown). In this manner, a circumferential ring of blades 260 may be formed about the rotor disc for rotation. In general, the turbine rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 has two side (or outer) walls 312, 314, each having outer surfaces that together define an airfoil shape. The first side wall 312 defines a suction side with a generally convex shape, and the second side wall 314 defines a pressure side with a generally concave shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics.

In an axial direction, the airfoil side walls 312, 314 extend from a base 324 at the platform 350 to a tip portion (or blade tip) 320. In general, the tip portion 320 is positioned to rotate in close proximity to the shroud 210 (FIG. 2) in order to maximize energy extraction, as introduced above.

As noted above, the turbine rotor blade 260, particularly the airfoil 310, is subject to extremely high temperatures resulting from high velocity hot gases ducted from the combustion section 140 (FIG. 2). If unaddressed, the extreme heat may affect the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from inlets in the root 360 through internal cavities and passages to cool the airfoil 310 via convection and conduction. The air flowing through the internal cooling system may flow out of the airfoil 310 through trailing edge slots 382 to provide temperature control of the trailing edge 318. Additionally, the cooling air flowing through the internal cooling system may also be supplied to film cooling holes arranged to provide a cooling film of fluid onto the surface of the airfoil 310. Moreover, as described below, cooling holes are provided to cool the tip portion 320 and to improve engine efficiency by minimizing tip leakage.

Figure 4:
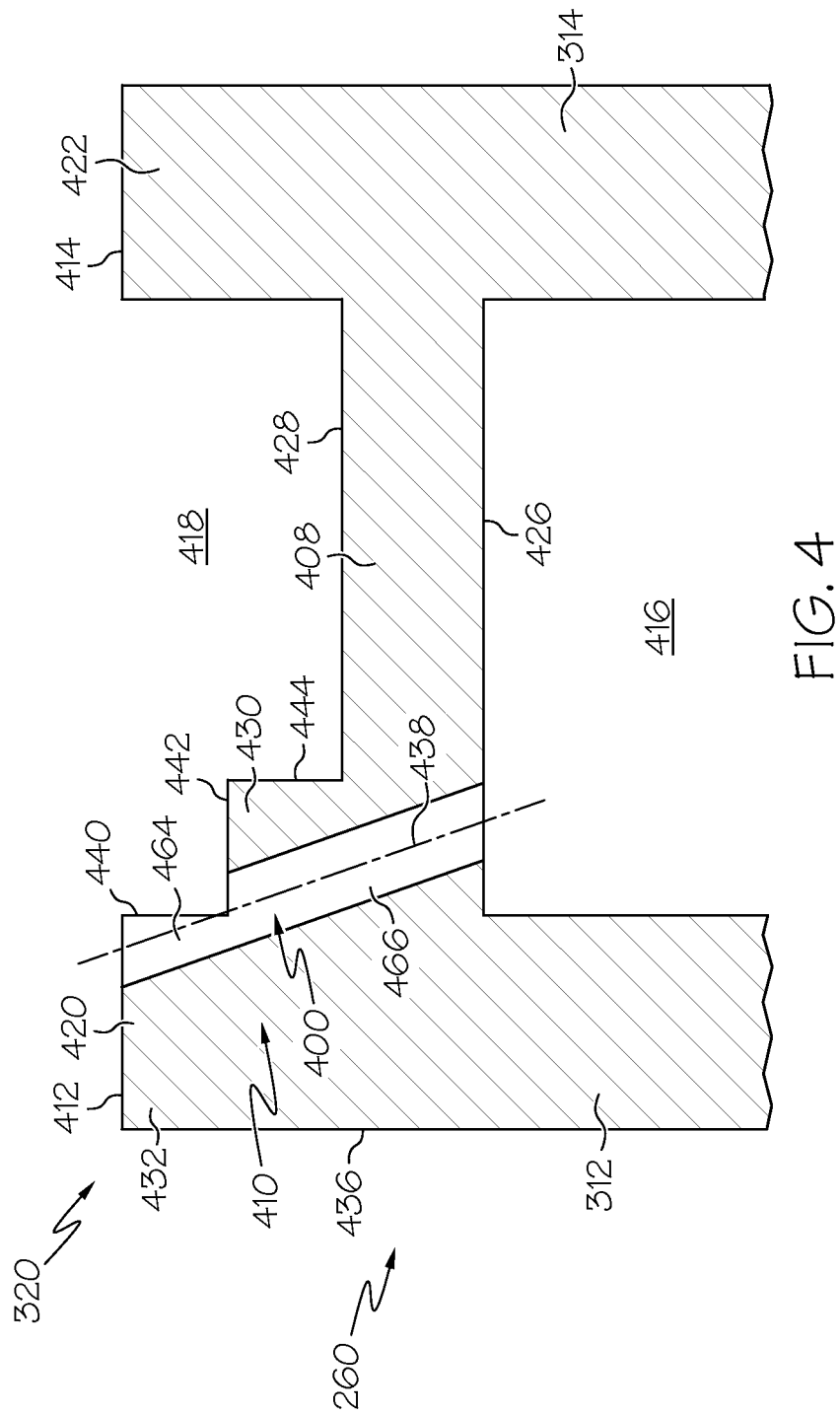
FIG. 4 is a simplified, close up, cross-sectional view of a tip portion of the turbine rotor blade through line 4-4 of FIG. 3 in accordance with an exemplary embodiment.
Figure 5:
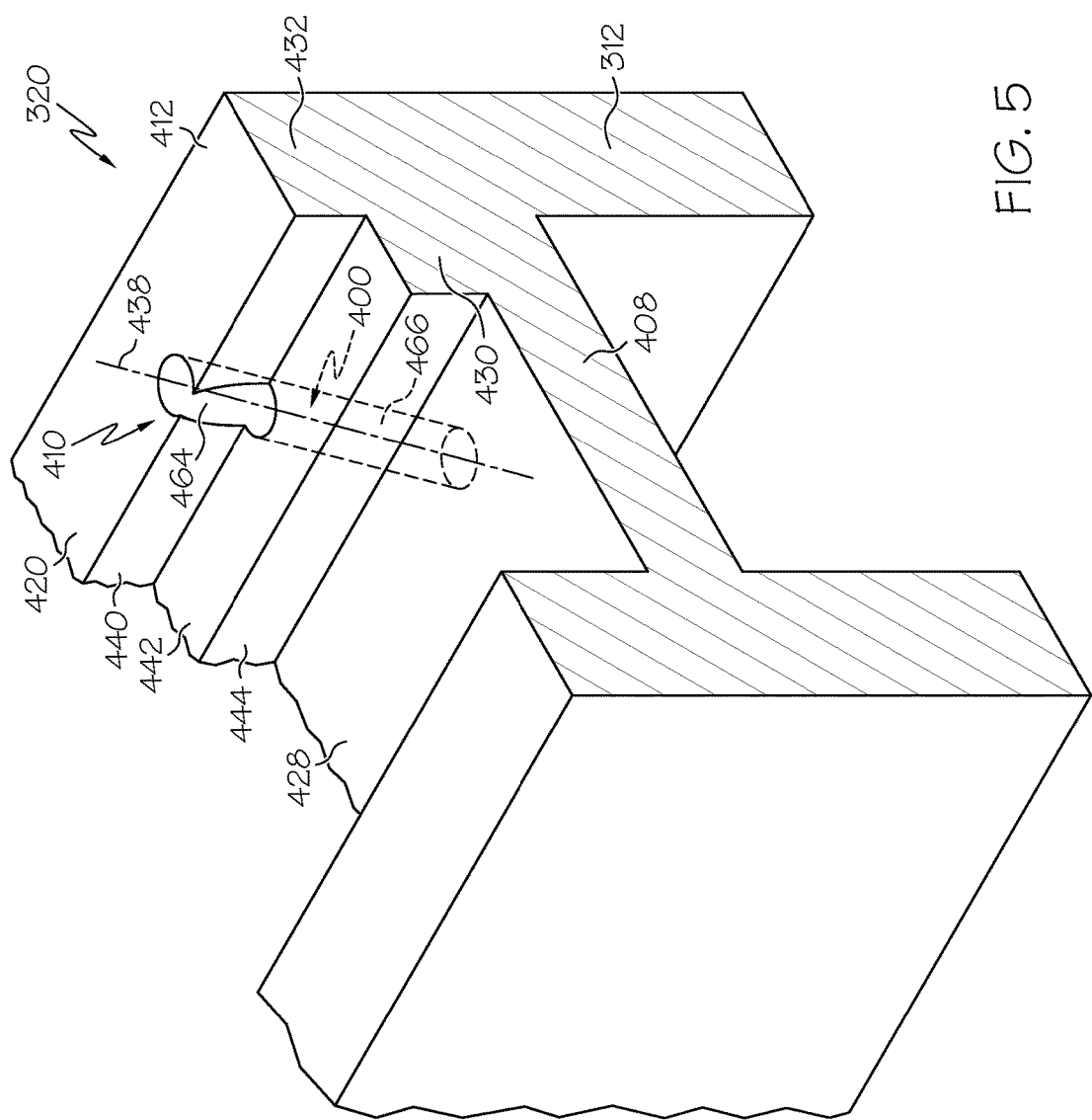
FIG. 5 is a sectional isometric view of the tip portion of FIG. 4 in accordance with an exemplary embodiment.

FIG. 4 is a partial cross-sectional view of the tip portion 320 of turbine rotor blade 260 through line 4-4 of FIG. 3 in accordance with an exemplary embodiment, and FIG. 5 is a sectional isometric view of the tip portion 320 in accordance with an exemplary embodiment. FIGS. 4 and 5 additionally show a portion of the interior structure of the rotor blade 260, which includes a cooling channel 416 that is part of a tip cooling circuit 410 that receives a flow of cooling air from passages in the root 360 (FIG. 3) and/or rotor discs (not shown). Such cooling air may be obtained as bleed flow from the compressor section 130 (FIG. 1). As described below, the cooing air is delivered through cooling holes 400 to cool the tip portion 320 and to improve engine efficiency.

As shown, the tip portion 320 may be considered to include a portion of the first side wall 312, a portion of the second side wall 314, a tip cap (or wall) 408, and a portion of tip cooling system 410. At radial edges, the first side wall 312 defines a first tip edge 412, and the second side wall 314 defines a second tip edge 414. Although the first side wall 312 is described below, exemplary embodiments discussed herein are equally applicable to the second side wall 314.

The tip cap 408 extends between the first side wall 312 and the second side wall 314 and is recessed a distance from the first and second tip edges 412, 414 to define first and second parapet walls 420, 422 on the first and second side walls 312, 314, respectively. An exposed surface 428 of the recessed tip cap 408, the first parapet wall 420 on the first side wall 312, and the second parapet wall 422 on the second side wall 314 together form a tip recess cavity 418. The parapet walls 420, 422 are substantially equal in height (as measured from the exposed surface 428 of the tip cap 408 to the first and second tip edges 412, 414, respectively), as depicted in FIGS. 4 and 5. Though not illustrated, in another embodiment, one of the parapet walls 420, 422 is shorter than the other so that a height difference exists therebetween, e.g., between about 0.05 mm and about 0.40 mm in height difference, as well as larger or smaller height differences. One parapet wall 420, 422 may additionally or alternatively be thicker than the other parapet wall 420, 422. In an embodiment, the first parapet wall 420 is about 1.30 to about 2.7 times thicker than the second parapet wall 422. In other embodiments, the difference in thickness and the thickness measurements may be greater or less than the aforementioned ranges. In any case, a coolant channel 416 is defined in part by an interior surface 426 of the tip cap 408 and the first and second side walls 312, 314.

During operation, as noted above, when the rotor (e.g., rotor 250 of FIG. 2) rotates, air from an airflow is ingested and directed to a corresponding blade, such as blade 260. Because the radial gap between the rotor and the shroud (e.g., shroud 210 in FIG. 2) is very small, the parapet walls 420, 422 may contact and abrade against a surface of the shroud to thereby reduce cooling of one or more of the parapet walls 420, 422 by either partially or completely blocking the exit of hole 400. To continue to provide cooling to the parapet walls 420, 422 and the tip cap 408 despite abrading, the blade 260 employs the tip cooling system 410 with the cooling holes 400 and step 430 described below.

The step 430 is formed between the first tip edge 412 and the exposed surface 428 of the tip cap 408. Although the step 430 is depicted as being formed on the first parapet wall 420, other embodiments alternatively may include the step 430 on the second parapet wall 422. By including the step 430, the parapet wall 420 is divided into an outer radial section 432 and inner radial section (e.g., the step 430). The outer radial section 432 is defined by the first tip edge 412 and an outer axial surface 440. The step 430 is defined by a radial surface 442 and an inner axial surface 444. Although illustrated in FIG. 4 as being substantially orthogonal relative to each other, the outer axial surface 440 and the radial surface 442 are not orthogonal in other embodiments. For example, the two surfaces 440, 442 can be angled relative to each other within a range of about 50° to about 160°.

The outer radial section 432 is configured to have a height measured from the step 430 to the tip edge 412 in a range of about 20% to about 80% of a total height of the parapet wall 420. In one exemplary embodiment, the height of the outer radial section 432 is selected such that removal of blade tip material during abrasion minimally affects the desired performance of the inner radial section (i.e., step 430). Thus, the height of the outer radial section 432 can be greater or less than the aforementioned range, in other embodiments. The thickness of the outer radial section 432 is about 35% to about 65% of a total thickness of the parapet wall 420 (the thickness measured from the inner axial surface 444 to an exterior surface 436 of the parapet wall 420), and the inner radial section (i.e., step 430) has a thickness that is equal to the parapet wall 420 total thickness. In other embodiments, the thicknesses are greater or less than the aforementioned ranges.

The cooling hole 400 has a centerline 438 and extends continuously from the parapet wall 420 (e.g., through the outer radial section 432 and the step 430) and the tip cap 408. The cooling hole 400 has an open channel section 464 and a closed channel section 466 (shown in FIG. 4 and depicted in phantom in FIG. 5), wherein the open channel section 464 extends through the outer radial section 432 (e.g., from the first tip edge 412 of the parapet wall 420) to the step 430 and the closed channel section 466 extends through the step 430 toward the interior surface 426 of the tip cap 408. The closed channel section 466 has a first shape continuing to the open channel section 464, such that the open channel section 464 has a second shape that is a portion of the first shape. In the exemplary embodiment illustrated in FIGS. 4 and 5, the closed channel section 466 is cylindrical, and the shape of the closed channel section 466 (i.e., the cylindrical shape) continues to the open channel section 464 to provide the open channel section 464 with a partial cylinder shape. The cylindrical shape has a substantially constant cross-sectional shape, in one embodiment. For example, the cross-sectional shape is a circle. Alternatively, the cross-sectional shape is another shape, such as an oval, a triangle, a different polygon shape, a teardrop, a fan or a different shape. According to one exemplary embodiment, the open and closed channel sections 464, 466 have substantially constant dimensions. In such case, the largest dimension of the open and closed channel sections 464, 466 may be in a range of about 0.2 mm to about 0.7 mm. In other embodiments, the largest dimension may be greater or less than the aforementioned range.

As illustrated in the exemplary embodiment of FIG. 4, the centerline 438 may be angled relative to the first tip edge 412. For example, the centerline 438 may be angled such that the cooling hole 400 is angled toward a streamwise direction of an airflow flowing across a surface of the tip portion 320. As used herein, the term "streamwise direction" is defined as a constant radius line on the surface of the airfoil 310 in the direction of the high temperature compressed air flow. The angle between the centerline 438 and the first tip edge 412 may be in a range of about 40° to about 60°, although other angles may be provided, including angles such that the centerline is inclined in a direction that is aligned with or opposing the streamwise direction (e.g., compound angle). In another embodiment, the centerline is substantially orthogonal relative to the first tip edge.

In still another embodiment, the shape and dimensions of the open and closed channel sections are not constant. For example, open channel section and the adjacent portion of the closed channel section may form a "diffuser angle section" extending along a centerline. Suitable shapes for the diffuser angle section include conical, frusto-conical, and the like. The diffuser angle section can have a cross-sectional having any shape suitable for allowing air to flow, such as oval, circle, fan, teardrop, triangle or another polygon, and the like.

Figure 6:
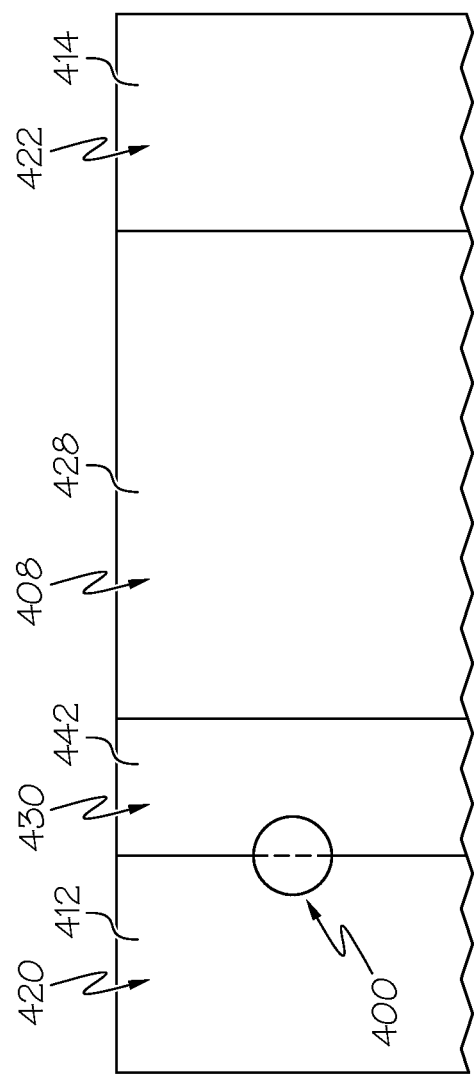
FIG. 6 is a partial top view the tip portion of FIG. 4 in accordance with an exemplary embodiment.

FIG. 6 is a partial top view of the tip portion 320. In particular, FIG. 6 depicts the first parapet wall 420, including the first tip edge 412; the step 430, including radial surface 442; the tip cap 408, including exposed surface 428; and second parapet wall 422, including the second tip edge 414. As shown and as described above, a portion of the cooling hole 400 extends through first tip edge 412, through the parapet wall 420, through the radial surface 442, through the step 430, though the tip cap 408, and to the cooling channel 416. As such, in this embodiment, the cooling hole 400 is cylindrically shaped throughout the length and extends through at least a portion of the radial surface 442. However, as described below, cooling holes with different configurations may be provided.

Figure 7:
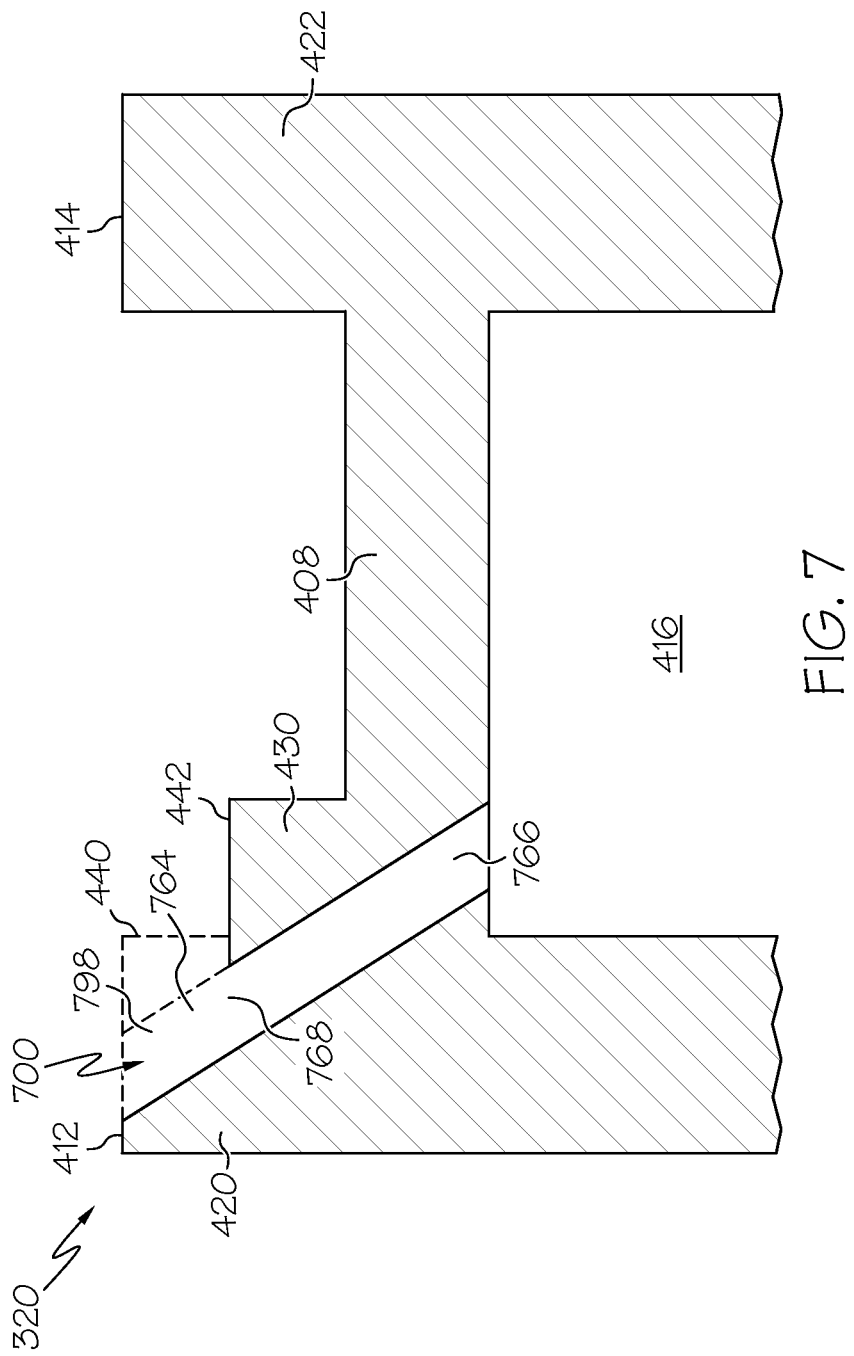
FIG. 7 is a simplified, close up, cross-sectional view of the tip portion of the turbine rotor blade through line 7-7 of FIG. 3 in accordance with an exemplary embodiment.
Figure 8:
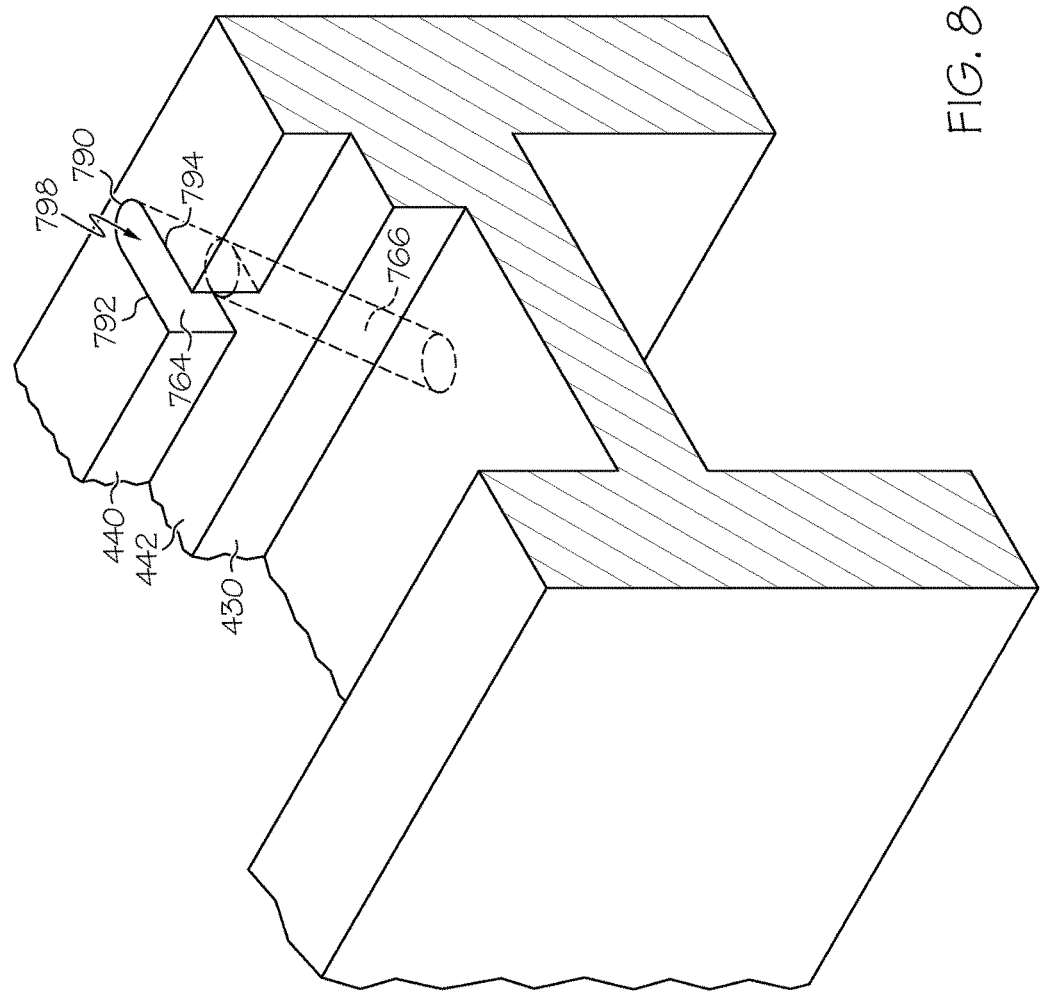
FIG. 8 is a sectional isometric view of the tip portion of FIG. 7 in accordance with an exemplary embodiment.
Figure 9:
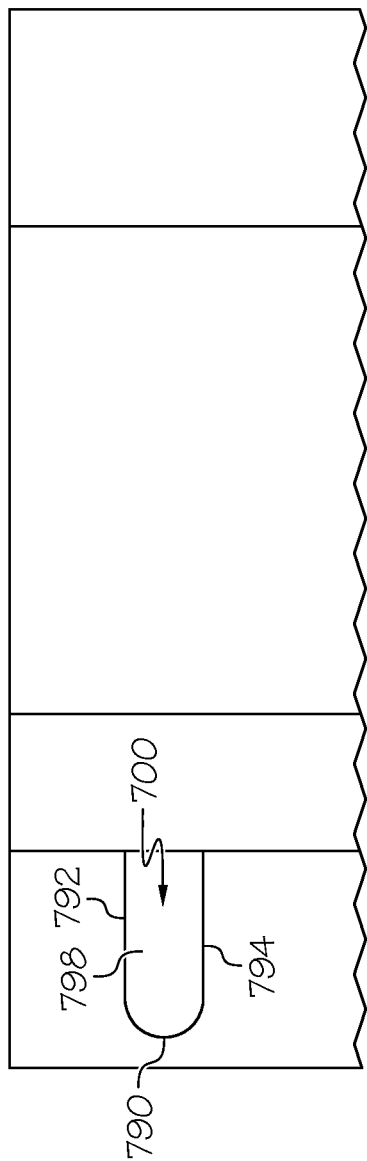
FIG. 9 is a partial top view the tip portion of FIG. 7 in accordance with an exemplary embodiment.

In particular, FIGS. 7-9 depict cooling holes 700 that may be incorporated into the tip portion 320 described above. In some embodiments, cooling holes 700 may be designed as an alternatives to the cooling holes 400 (FIGS. 4-6), while in other embodiments, cooling holes 700 may be used with cooling holes 400.

FIG. 7 is a partial cross-sectional view of the tip portion 320 of rotor blade 260 through line 7-7 of FIG. 3 in accordance with an exemplary embodiment, and FIG. 8 is a sectional isometric view of the tip portion 320 in accordance with an exemplary embodiment. FIG. 9 is a partial top view of the tip portion 320 generally corresponding to the features depicted in FIGS. 7 and 8. As such, FIGS. 7-9 generally correspond to the same views of FIGS. 4-6, respectively, at a different chordwise location along the tip portion 320. In general, the cooling holes 700 may be provided at any chordwise location.

As in the views discussed above, the tip portion 320 of FIG. 7 includes the tip cap 408, the first and second parapet walls 420, 422 respectively defining the first and second tip edges 412, 414, and the step 430 defining radial surface 442. As above, the exemplary embodiment of FIGS. 7-9 includes one or more cooling holes 700 extending from the cooling channel 416 that receives a flow of cooling air from passages in the root 360 (FIG. 3) and/or rotor discs (not shown).

In this exemplary embodiment, the cooling hole 700 extends through the first tip edge 412, through the parapet wall 420, through the step 430, through the tip cap 408, and to the cooling channel 416. As such, in this embodiment, the cooling hole 700 generally does not extend through the radial surface 442. This configuration may be a result of design or a result of manufacturing tolerances. For example, during the formation of the cooling holes 400 described above in FIGS. 4-6, the drilling tool may be unable to place portions of the cooling hole on both of the parapet wall 420 and the radial surface 442 of the step 430, e.g., in effect, "missing" the step 430, which may possibly lead to blockages as the tip edge 412 abrades against the shroud. As described below, cooling holes 700 address this issue.

The cooling hole 700 has an open channel section 764 and a closed channel section 766, wherein the open channel section 764 extends through the outer radial section 432 (e.g., from the first tip edge 412 of the parapet wall 420) to the step 430 and the closed channel section 766 extends through the step 430 and the tip cap 408. In the exemplary embodiment illustrated in FIGS. 7-9, the closed channel section 766 is cylindrical, and the shape of the open channel section 764 is a slot 798. In particular, the open channel section 764 has a first edge 790 that generally corresponds to a first edge of the closed channel section 766. However, the open channel section 764 has side walls 792, 794 that extend from the first edge 790 to the surface 440 of the parapet wall 420. As noted above, the cooling hole 700 generally does not extend through the radial surface 442. As a result of this arrangement, the closed channel section 766 may be considered to have an outlet 768 that is at a distance to the radial surface 442 of the step 430, e.g., the closed channel section 766 transitions to the open channel section 764 at a distance from the radial surface 442 of the step.

The resulting shape and configuration of the cooling hole 700 is best shown by FIGS. 8 and 9, which depict the extended side walls 792, 794. In the depicted exemplary embodiment, the side walls 792, 794 are parallel to one another; however, in other embodiments, the side walls 792, 794 may be angled relative to one another such that the slot 798 widens from the first edge 790 to the surface 440.

In the depicted embodiment, the cooling hole 700 is angled relative to the first tip edge 412, such that the side walls 792, 794 of the slot 798 forming the open channel section 764 will generally lengthen as the cooling hole 700 extends to the first tip edge 412. However, if a corresponding cooling hole is orthogonal to the first tip edge 412, such side walls may be generally constant from the step 430 to the first tip edge 412. As a result of the slot 798 formed by the open channel section 764, the cooling holes 700 may remain unblocked, even considering the challenges of manufacturing.

Figure 10:
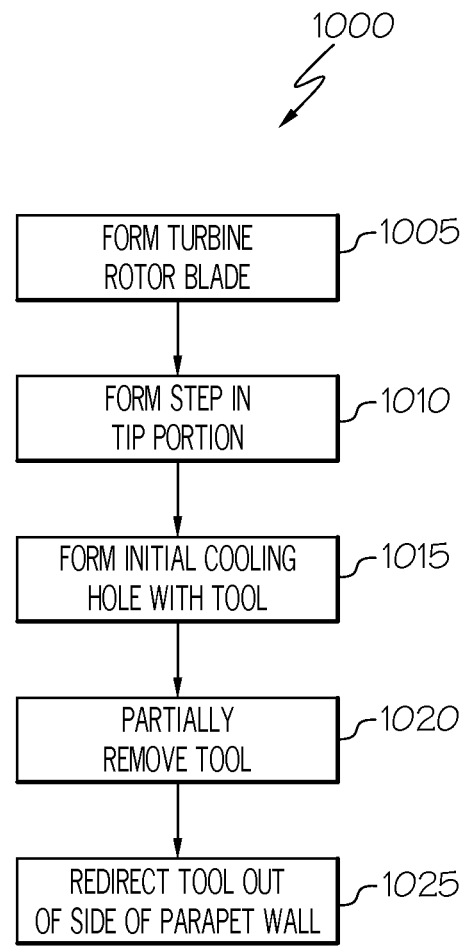
FIG. 10 is a flow chart of a method for forming a turbine rotor blade in accordance with an exemplary embodiment.

The exemplary embodiments discussed above may be manufactured in any suitable ways. For example, FIG. 10 is a flow chart of a method 1000 for forming a turbine rotor blade (e.g., rotor blade 260 of FIGS. 2-9 in accordance with an exemplary embodiment). In a first step 1005, the rotor blade, including a tip portion with parapet walls, may be formed by a lost wax casting process or any other suitable process. In a second step 1010, a step in the tip portion may also be formed in the rotor blade. As examples, the step may be formed with the blade in the lost wax casting process of step 1005, or the step may be machined into the blade after step 1005. In steps 1015, 1020, and 1025, the cooling holes 400, 700 are formed. In particular, in step 1015, the cooling holes (e.g., cooling holes 400, 700) are initially formed with electro-discharge machining by using a tool (e.g., an electrode) that extends into the parapet wall (e.g., parapet wall 420) and to the cooling chamber (e.g., cooling channel 416).

Figure 11:
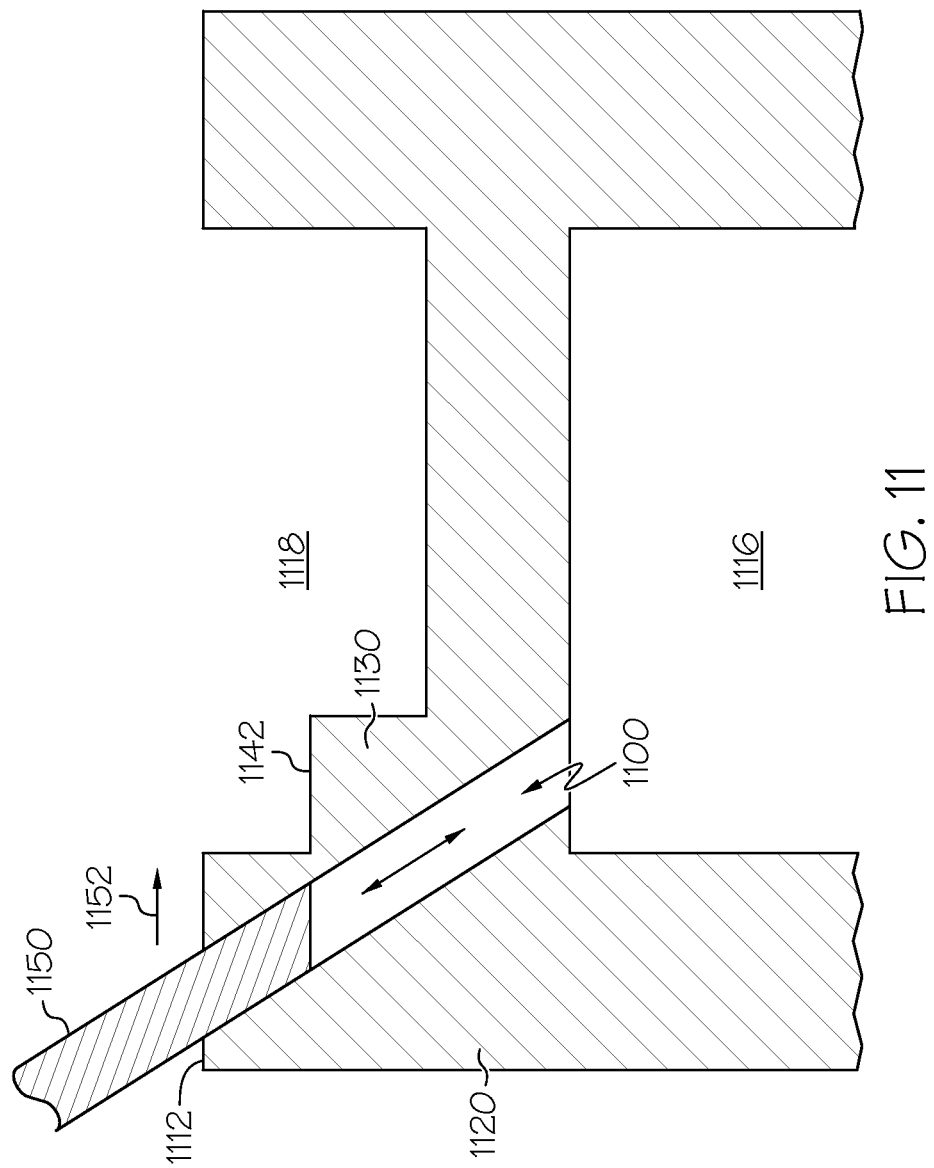
FIG. 11 is a simplified, close-up, cross-sectional view of a tip portion of a turbine rotor blade during a step of the method of FIG. 10 in accordance with an exemplary embodiment.

In step 1020, as the tool is removed along the longitudinal axis of the initial hole, the tool changes direction at a radial position or height corresponding approximately to the radial surface of the step. As an example, FIG. 11 depicts this step in an exemplary workpiece that includes parapet wall 1120 with a first tip edge 1112, a tip cap cavity 1118, and a step 1130 with a radial surface 1142. The tool 1150 has formed the initial cooling hole 1100 by inserting the tool 1150 from edge 1112 to the cooling channel 1116, and according to step 1020, partially removes the tool 1150 to a radial position corresponding to the radial surface 1142, as shown in FIG. 11.

In step 1025, the tool is redirected towards the recess cavity, e.g., out of the side of the parapet wall. Using FIG. 11 as an example again, the tool 1150 is moved in the direction indicated by arrow 1152 to form the slot 798 of the cooling hole 700 discussed above. In effect, step 1025 removes a portion of the parapet wall 1120 in the direction 1152 to the recess cavity. The direction 1152 may be considered an axial direction. Upon completion of step 1025, the workpiece of FIG. 11 generally corresponds to the tip portion 720 discussed above with respect to FIGS. 7-9, and the method 1000 is complete. Additional steps and/or alternative techniques may be provided. For example, the tip portions with the cooling holes (e.g., cooling holes 400, 700) may be directly formed with additive manufacturing techniques.

As noted above, the method 1000 described above may produce cooling holes 700 as discussed with reference to FIGS. 7-9. However, the method 1000 may also be suitable for producing cooling holes 400 as discussed with reference to FIGS. 4-6. In particular, if the tool in step 1020 forms the initial hole through a portion of the radial surface (e.g., radial surface 442 of step 430), step 1025 may have no impact on the resulting cooling hole since the initial cooling hole is already formed on one side of the parapet wall. As a result, method 1000 produces cooling holes that prevent or mitigate blockages resulting from abrading on the shroud by providing an open channel, either in step 1020 by forming the initial hole in the side of the parapet wall and radial surface of the step, or in step 1025 by forming a slot between the initial hole and the side of the parapet wall.

As a result, the cooling holes discussed above enable closer clearances between the turbine rotor blades and the shroud, thereby reducing or mitigating tip leakage flow over gas turbine blades is a source of efficiency loss and consequently an undesirable increase in overall engine Specific Fuel Consumption (SFC). Additionally, the improved tip portion cooling may enable a reduction in cooling air that may be used in other locations and/or redirected to mainstream gas flow. The increase in efficiency resulting from the cooling air provided to the tip portion through the cooling holes may more than make up for the efficiency cost of supplying the cooling air, particularly as a result of the converging nature of the corresponding high pressure and velocity. Exemplary embodiments of the turbine blades discussed above have resulted in an ability to increase engine temperature, thereby improving fuel consumption.

Computational fluid dynamic (CFD) analysis may be used to optimize the location and orientation of the cooling holes. Exemplary embodiments promote the service life and/or enhanced performance in a cost-effective manner. The turbine blades produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine rotor blade for a turbine section of an engine, the turbine rotor blade comprising:
a platform; and
an airfoil extending from the platform into a mainstream gas path of the turbine section, the airfoil comprising
a first side wall;
a second side wall joined to the first side wall at a leading edge and a trailing edge;
a tip cap extending between the first side wall and the second side wall;
a first parapet wall extending from the first side wall; and
a first cooling hole through the tip cap and the first parapet wall configured to deliver cooling air, the first cooling hole having a closed channel section and an open channel section, the open channel section forming a slot,
wherein the first parapet wall is defined by a first axial surface on a first side facing the tip cap, a radial tip edge, and a second axial surface on a second side opposite the tip cap, and wherein the open channel section is open relative to the first axial surface,
wherein the slot has at least two parallel straight side edges extending to the first axial surface,
wherein the airfoil further comprises a step extending in a chordwise direction and formed between the first axial surface of the first parapet wall and the tip cap, the step having a radial step surface and axial step surface, and
wherein the first cooling hole transitions from the closed channel section to the open channel section at a distance from the radial step surface.

2. The turbine rotor blade of claim 1, wherein the closed channel section is a first closed channel section and the open channel section is a first open channel section, and wherein the airfoil further comprises a second cooling hole with a second closed channel section and a second open channel section, the second open channel section having a cylindrical cross-sectional shape.

3. The turbine rotor blade of claim 2, wherein the second cooling hole extends through the radial step surface.

4. A method for manufacturing a turbine rotor blade, comprising the steps of:
forming the turbine rotor blade including a tip portion with a first parapet wall, a second parapet wall, a tip cap extending between the first and second parapet walls, and a cooling channel at least partially defined by the tip cap;
forming a step between the first parapet wall and the tip cap;
forming an initial hole with a longitudinal axis by inserting a tool from a tip edge on the first parapet wall to the cooling channel;
removing the tool along the longitudinal axis of the initial hole to a height approximately equal to the step; and
removing the tool from the first parapet wall in a generally axial direction to form a cooling hole.

5. The method of claim 4, wherein the step of forming the initial hole includes forming a closed channel section and wherein the step of removing the tool from the first parapet wall includes forming an open channel section such that the cooling hole includes the closed channel section and the open channel section.

6. The method of claim 5, wherein the step of removing the tool from the first parapet wall includes forming the open channel section as a slot.

7. The method of claim 6, wherein the step of removing the tool from the first parapet wall includes forming the slot with straight edges.

8. The method of claim 6, wherein the step of removing the tool from the first parapet wall includes forming the open channel section through a side surface of the first parapet wall.

9. The method of claim 4, wherein the step of forming the initial hole includes forming the initial hole at a distance from a radial surface of the step.

10. The method of claim 4, wherein the initial hole is a first initial hole and the cooling hole is a first cooling hole, wherein the method further comprises forming a second cooling hole extending from the tip edge on the first parapet wall, through a radial surface of the step, and to the cooling channel.

11. A method for manufacturing a turbine rotor blade, comprising the steps of:
forming the turbine rotor blade including a tip portion with a first parapet wall, a second parapet wall, a tip cap extending between the first and second parapet walls, and a cooling channel at least partially defined by the tip cap;
forming a step between the first parapet wall and the tip cap;
forming an initial hole between a tip edge on the first parapet wall and the cooling channel; and
forming a slot between the initial hole and a side surface of the first parapet wall to result in a first cooling hole,
wherein the step of forming the initial hole includes forming the initial hole with a longitudinal axis by inserting a tool from a tip edge on the first parapet wall to the cooling channel, and
wherein the step of forming the slot includes removing the tool from the initial hole along the longitudinal axis of the initial hole to a height approximately equal to the step and removing the tool from the first parapet wall in an interior direction that is generally perpendicular to a radial direction to form the first cooling hole.

12. The method of claim 11, wherein the step of forming the initial hole includes forming a closed channel section, and wherein the step of removing the tool from the first parapet wall includes forming an open channel section such that the cooling hole includes the closed channel section and the open channel section.

13. The method of claim 12, wherein the step of removing the tool from the first parapet wall includes forming the slot with straight edges.

14. The method of claim 11 wherein the step of forming the initial hole includes forming the initial hole at a distance from a radial surface of the step.

15. The method of claim 14, wherein the cooling hole is a first cooling hole, wherein the method further comprises
forming a second cooling hole extending from the tip edge on the first parapet wall, through a radial surface of the step, and to the cooling channel.

* * * * *